(12) United States Patent
Hall et al.

(10) Patent No.: US 7,677,672 B2
(45) Date of Patent: Mar. 16, 2010

(54) DEPTH DETECTING ASSEMBLY

(76) Inventors: David R. Hall, 2185 S. Larsen Pkwy., Provo, UT (US) 84606; David Wahlquist, 2185 S. Larsen Pkwy., Provo, UT (US) 84606; Neil Cannon, 2185 S. Larsen Pkwy., Provo, UT (US) 84606

( * ) Notice: Subject to any disclaimer, the term of this patent is extended or adjusted under 35 U.S.C. 154(b) by 208 days.

(21) Appl. No.: 12/039,917

(22) Filed: Feb. 29, 2008

(65) Prior Publication Data

US 2009/0015056 A1   Jan. 15, 2009

Related U.S. Application Data

(63) Continuation-in-part of application No. 11/837,347, filed on Aug. 10, 2007, and a continuation-in-part of application No. 11/774,635, filed on Jul. 9, 2007.

(51) Int. Cl.
*E01C 23/088* (2006.01)

(52) U.S. Cl. ....................... 299/1.05; 299/1.5

(58) Field of Classification Search ............... 299/1.05, 299/1.5; 404/84.05
See application file for complete search history.

(56) References Cited

U.S. PATENT DOCUMENTS

| 5,607,205 | A | * | 3/1997 | Burdick et al. ............ 299/1.5 |
| 5,786,696 | A | | 7/1998 | Weaver |
| 7,077,601 | B2 | | 7/2006 | Lloyd |

* cited by examiner

*Primary Examiner*—John Kreck
(74) *Attorney, Agent, or Firm*—Tyson J. Wilde

(57) ABSTRACT

In one aspect of the invention, a milling machine for milling a paved surface comprises milling tools connected to an underside of a body of the machine and also a depth probe comprising a base end opposite a distal end. The probe is connected to a front end of the machine through a probe base disposed proximate the base end. A monitor is adapted to detect a distance between the distal end of the probe and an outer surface of the base. The distal end of the probe is adapted to extend away from the outer surface of the base and penetrate into a paved surface.

17 Claims, 9 Drawing Sheets

900 ↘

```
┌─────────────────────────────────────────────────┐
│  Provide a milling machine comprising milling   │
│  tools connected to an underside of a body of   │
│  the machines and comprising a depth probe      │
│  connected to a front end of the machine        │
│  through a probe base disposed proximate a base │
│  end of the probe opposite a distal end of the  │
│  probe                                          │
│                                           901   │
└─────────────────────────────────────────────────┘
                         │
┌─────────────────────────────────────────────────┐
│  Extend the distal end of the probe away from   │
│  the base                                       │
│                                           902   │
└─────────────────────────────────────────────────┘
                         │
┌─────────────────────────────────────────────────┐
│  Penetrate a paved surface with the distal end  │
│  of the probe unitil the distal end contacts a  │
│  ferrous metal object or until the distal end   │
│  contacts a road base beneath the paved         │
│  surface                                        │
│                                           903   │
└─────────────────────────────────────────────────┘
                         │
┌─────────────────────────────────────────────────┐
│  Measure a depth of insertion of the probe into │
│  the paved surface                              │
│                                           904   │
└─────────────────────────────────────────────────┘
```

Fig. 9

DEPTH DETECTING ASSEMBLY

CROSS REFERENCE TO RELATED APPLICATIONS

This application is a continuation-in part of both U.S. patent application Ser. Nos. 11/837,347 filed on Aug. 10, 2007 and 11/774,635 filed on Jul. 9, 2007. Both of these applications are herein incorporated by reference for all that they disclose.

BACKGROUND OF THE INVENTION

The current invention relates to milling machines for milling asphalt or concrete in roads, sidewalks, parking lots, or other paved surfaces. While milling and resurfacing a paved surface, the milling machines often encounter metal objects which are covered partially or completely by the paved surface such as manhole covers or railroad tracks. In such circumstances, if the metal object isn't detected beforehand, the object, milling tools on the milling machine, or both may be damaged. Some inventions of the prior art disclose metal detectors in combination with a pavement resurfacing machine.

U.S. Pat. No. 7,077,601 to Lloyd, which is herein incorporated by reference for all that it contains, discloses a machine for providing hot-in-place recycling and repaving an existing asphalt-based pavement, in which the pavement is first heated.

U.S. Pat. No. 5,786,696 to Weaver et al., which is herein incorporated by reference for all that it contains, discloses a metal detector which utilizes digital signal processing and a microprocessor to process buffers of information which is received at a periodic rate. The metal detector is able to determine the depth of a target by comparing the quadrature phase components received from first and second receive antennas. The size of the target is determined by reference to a look-up table based on the depth factor and the signal amplitude determined for the target object.

U.S. patent application Ser. No. 11/837,347, filed on Aug. 10, 2007 by Hall et al., which is herein incorporated by reference for all that it contains, discloses a metal detector for a milling machine.

U.S. patent application Ser. No. 11/774,635 by Hall et al, filed on Jul. 9, 2007, which is herein incorporated by reference for all that it contains, discloses a metal detector for an asphalt milling machine.

BRIEF SUMMARY OF THE INVENTION

In one aspect of the invention, a milling machine for milling a paved surface comprises milling tools connected to an underside of a body of the machine and also a depth probe comprising a base end opposite a distal end. The probe is connected to a front end of the machine through a probe base disposed proximate the base end. A monitor is adapted to detect a distance between the distal end of the probe and an outer surface of the base. The distal end of the probe is adapted to extend away from the outer surface of the base and penetrate into a paved surface. The depth probe may be adapted to determine a depth of a buried metal object in the paved surface. The monitor may be adapted to detect a change in pressure when the depth probe contacts a buried ferrous metal object and/or a road base.

The machine may comprises a hydraulic press disposed intermediate the base of the probe and the body of the machine. The hydraulic press may be adapted to extend the distal end of the probe away from the body of the machine. The probe may push against the body of the machine.

The machine may comprise electronic equipment in electrical communication with the monitor. The equipment may be adapted to interpret feedback from the monitor and/or record the position of the distal end of the probe with respect to the underside of the body of the machine. The milling tools may be adapted to be automatically laterally or vertically adjusted by the electronic equipment in response to feedback from the monitor. In some embodiments the depth probe may be positioned within 8 feet of the milling tools. The probe base may be adapted to translate parallel to a direction of travel of the machine.

The depth probe may be disposed intermediate at least one magnetic sensor attached to the front end of the machine and the milling tools. In some embodiments a detection range of the at least one magnetic sensor may extend farther into the paved surface than a detection range of the extendable depth probe.

The machine may comprise a plurality of depth probes arranged in an array. The plurality of depth probes may be adapted to determine a safe perimeter around a buried ferrous metal object by penetrating the paved surface. At least two of the plurality of depth probes may be positioned at different angles. In some embodiments at least two of the plurality of depth probes may each comprise an electrode or a magnetic sensor disposed on the distal end.

In another aspect of the invention, a method for metal detection during milling of a paved surface comprises a step of providing a milling machine comprising milling tools connected to an underside of a body of the machine and comprising a depth probe connected to a front end of the machine through a probe base disposed proximate a base end of the probe opposite a distal end of the probe. The method further comprises steps of extending the distal end of the probe away from the base and penetrating a paved surface with the distal end of the probe until the distal end contacts a ferrous metal object. The method further comprises a step of measuring a depth of insertion of the probe into the paved surface. The method may further comprise a step of sensing a ferrous metallic object disposed beneath a road surface from above the road surface. In some embodiments the method may comprise a step of passing an electrical current and/or a magnetic field through the ferrous metal object from the distal end of a first depth probe to the distal end of a second depth probe.

In another aspect of the invention, a milling machine for milling paved surfaces has milling tools connected to an underside of the body of the machine and a depth detection assembly connected to a front end of the machine. The depth detection assembly is adapted to detect a depth of a metal object underneath a paved surface. The depth detection assembly may comprise a probe or ground penetrating radar.

BRIEF DESCRIPTION OF THE DRAWINGS

FIG. 9 is a flow chart of a method for metal detection during the milling of a paved surface.

DETAILED DESCRIPTION OF THE INVENTION AND THE PREFERRED EMBODIMENT

Figure 1:
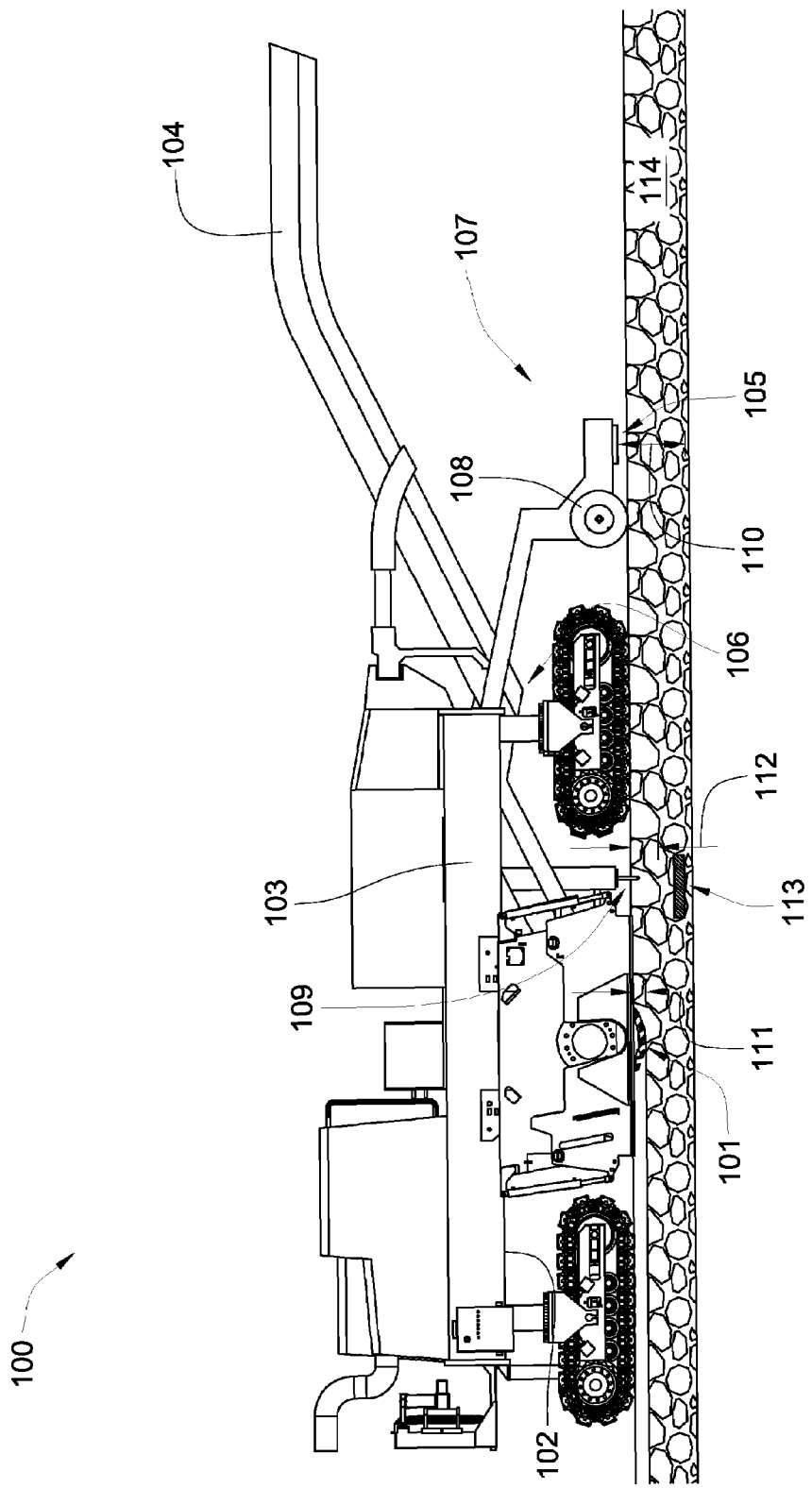
FIG. 1 is an orthogonal diagram of an embodiment of a milling machine.

FIG. 1 depicts a milling machine 100 which may be used to remove asphalt or concrete from a paved surface 114. Milling tools 101 such as a milling drum are attached to an underside 102 of a body 103 of the milling machine 100. A conveyer 104 is adapted to lift the millings off the surface. Typically the millings are loaded into a bed of a truck (not shown) where the millings may be hauled away. The milling machine 100 also comprises an extendable depth probe 109 attached to a front end 106 of the machine 100. The milling machine 100 also may also comprise at bast one magnetic sensor 105 attached to the front end 106 of the machine 100 adapted to detect metal objects, such as manhole covers, in the paved surface at a predetermined detection depth. The ferrous metal detector may comprise at least one induction coil. The detector 105 may be attached at a distance far enough away from the body 103 of the machine 100 such that metal in the body 103 doesn't interfere with the magnetic sensor 105. The machine may comprise an extension 107 on the front end 106 of the machine 100 to which the magnetic sensor 105 may be attached, as is disclosed in FIG. 1. The extension 107 may comprise wheels 108 and may be pivotally attached to the body 103, which may allow the extension 107 to move along the paved surface such that the detector 105 may maintain a constant height above the paved surface. In some embodiments the depth probe 109 may also be disposed on the extension 107. In the embodiment of FIG. 1 the depth probe 109 is disposed intermediate a magnetic sensor 105 and the milling tools 101. In some embodiments the depth probe 109 may be positioned within 8 feet of the milling tools 101.

A detection range 110 of the magnetic sensor 105 may be fixed based on a cutting depth 202 of the milling tools 101. The detection range 110 may be the limit of the distance from the magnetic sensor 105 in which the detector 105 may detect a ferrous metal object 113. After the cutting depth 111 of the milling tools 101 is set, the detection range 110 of the magnetic sensor 105 may be set at or below the cutting depth 111, such that the magnetic sensor 105 may detect metal objects 113 which may interfere with the cutting of the milling tools 101. The depth probe 109 may comprise a detection depth 112. The detection depth 112 may extend further into the paved surface 114 than the cutting depth 111. In some embodiments the detection range 110 of the magnetic sensor 105 may extend farther into the paved surface 114 than the detection depth 112 of the depth probe. In such cases the magnetic sensor 105 may detect ferrous metal objects 113 that will not interfere with the cutting of the milling tools 101. In such cases the extendable depth probe 109 may be used to determine the whether the metal object 113 will interfere with the cutting of the milling tools 101 by determining the depth of the buried metal object 113 in the paved surface 114. In some embodiments the milling machine 100 may comprise an extendable depth probe 109 and no other magnetic sensor 105.

The depth probe 109 aid/or the magnetic sensor comprise a sensitivity that is adjustable such that only metal objects 113 large enough to affect the milling operation may be detected.

The probe 109 may be positioned from 0.5 to 8 inches above the paved surface during operation. In some embodiments, the depth probe 109 may be adapted to detect metal objects 113 buried up to 1 foot in the paved surface 114. In other embodiments, the depth probe 109 may be adapted to detect metal objects 113 up to 3 feet deep.

When a metal object 203 is detected which may interfere with the milling tools 101, the milling tools 101 may be raised such that the milling tools 101 pass over the metal object 203, as indicated by the vertical arrow 204, which may prevent damage to the metal object 203 and/or the milling tools 101. Other components such as a moldboard may be raised to prevent damage as well. The components may be manually controlled by a machine operator or it may be automatically controlled by electronic equipment in a closed-loop system.

The present invention may be used in a milling machine comprising a plurality of rotary bits as milling tools 101. An example of such a machine that may be compatible with the present invention is disclosed in U.S. Pat. No. 7,223,049 to Hall, which is herein incorporated by reference for all that it discloses. The milling tools 101 may be adapted to be automatically laterally adjusted in a closed-loop system. A depth probe 109 may be in electrical communication with electronic equipment in the closed-loop system, such that feedback from the probe 109 may be used to automatically control the lateral positions of the milling tools 101. As the probe 109 contacts a metal object 113 such as a manhole cover, the feedback from the probe may be interpreted by a processor and stored in memory. The electronic equipment may comprise a controller in electrical communication with the milling tools 101 adapted to control the lateral movement of the milling tools 101 such that the tools may mill around the metal object. The controller may also control the rotation of the tools.

Figure 2:
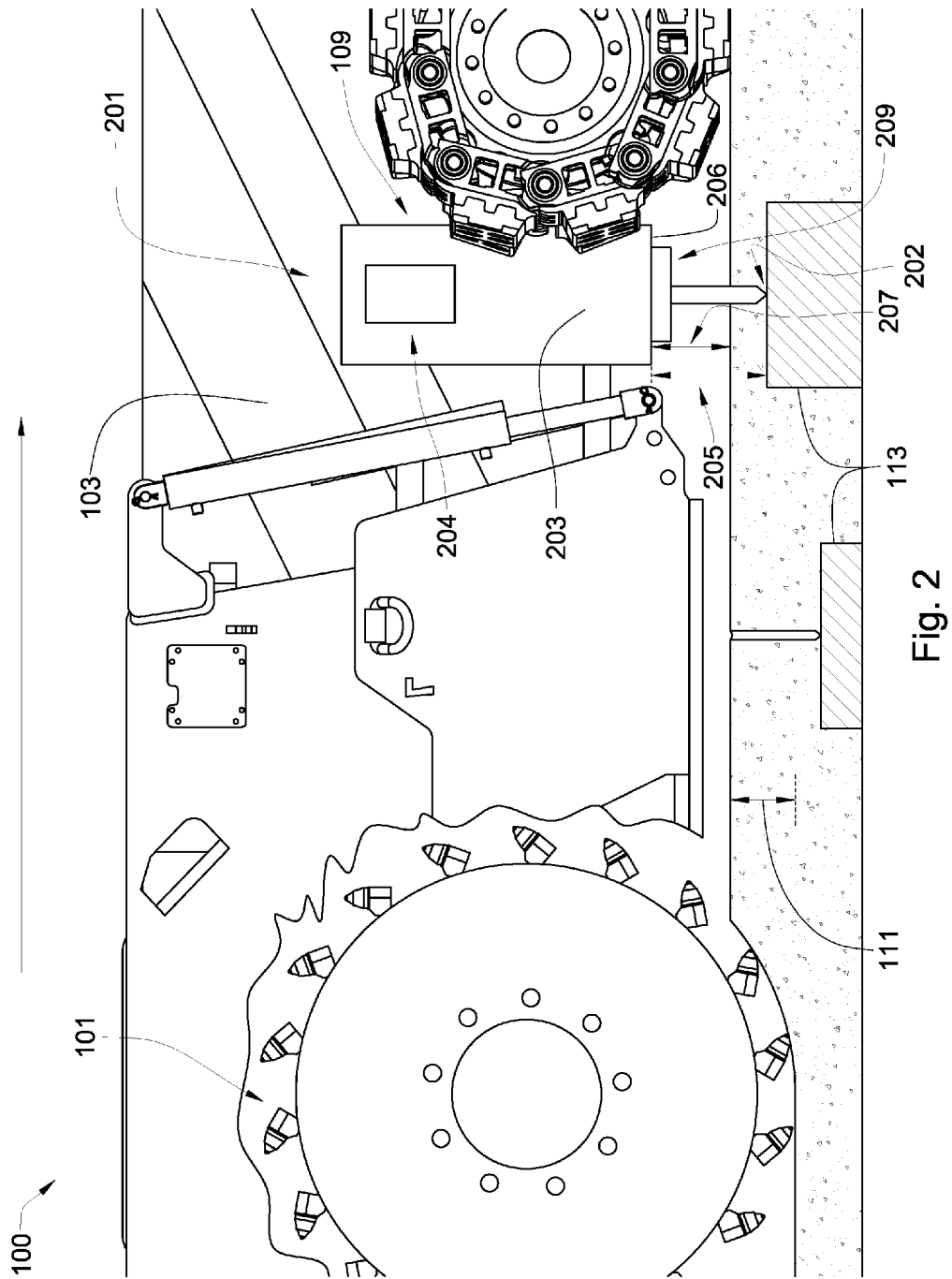
FIG. 2 is an orthogonal diagram of another embodiment of a milling machine.

Referring now to FIG. 2, the depth probe 109 comprises a base end 201 opposite a distal end 202. The probe 109 is connected to the milling machine 100 through a probe base 203 disposed proximate the base end 201. The milling machine also comprises a monitor 204 adapted to detect a distance 205 between the distal end 202 of the probe 109 and an outer surface 206 of the base 203. The distal end 202 of the probe 109 is adapted to extend away from the outer surface 206 of the base 203 and penetrate into the paved surface 114. The distance 205 detected by the monitor 204 may be converted into the depth of a buried metal object 113 by subtracting the height 207 of the base's outer surface 206 above the paved surface 114. In some embodiments the monitor 204 may be adapted to detect a change in pressure when the depth probe contacts a buried ferrous metal object 113. In the event that the probe does not contact a buried ferrous metal object 113 but penetrates the paved surface 114 until the probe contacts a road base 208, the monitor may be adapted to recognize that the probe 109 has contacted the road base 208.

In some embodiments the machine may comprise electronic equipment that is in electrical communication with the monitor 204. The equipment may be adapted to interpret feedback from the monitor 204 and/or record the position of the distal end 202 of the probe 109 with respect to the outer surface 206 of the base. In some embodiments the milling tools 101 may be adapted to be automatically laterally or vertically adjusted by the electronic equipment in response to feedback from the monitor 204.

When the distal end 202 of the probe 109 extends away from the base 203, the probe may push against the body 103 of the machine 100 via the base 203. In FIG. 2 the machine comprises a hydraulic press 209 that is disposed intermediate the probe base 203 and the machine body 103. The hydraulic press 209 is adapted to extend the distal end 202 of the probe 109 away from the machine body 103.

Figure 3:
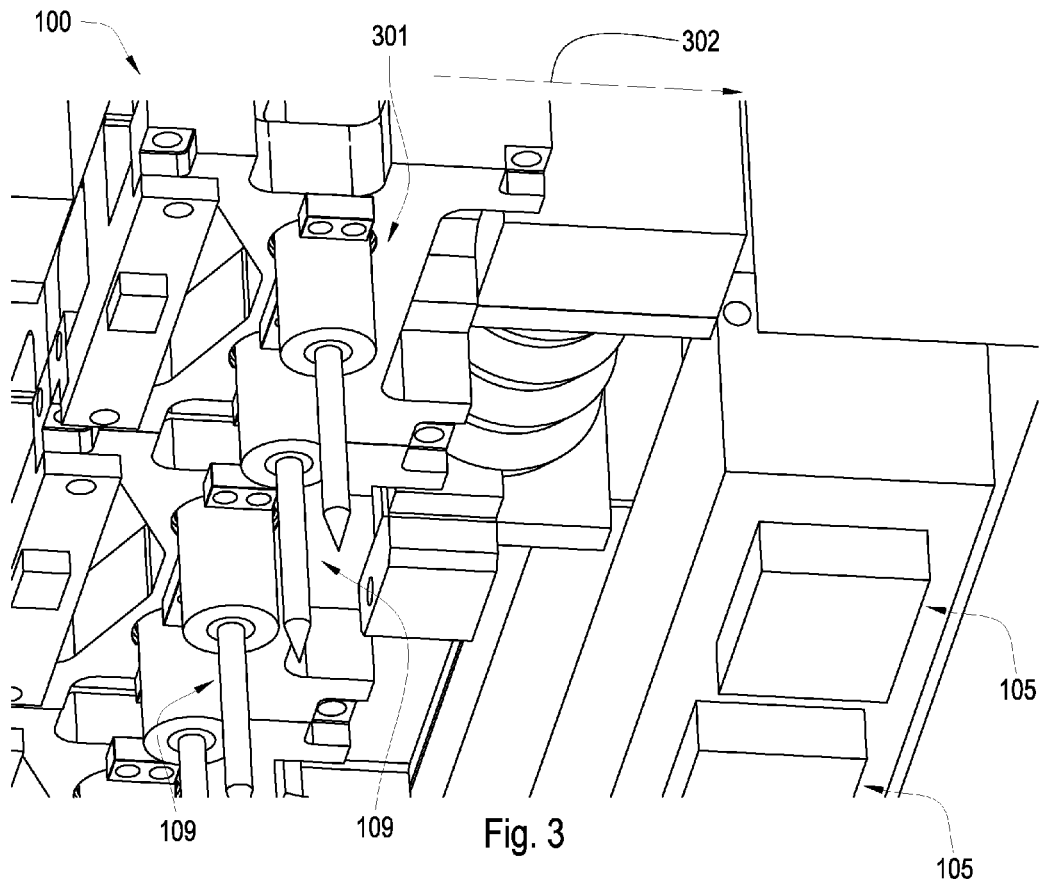
FIG. 3 is a perspective diagram of an embodiment of an underside of a milling machine.
Figure 3A:
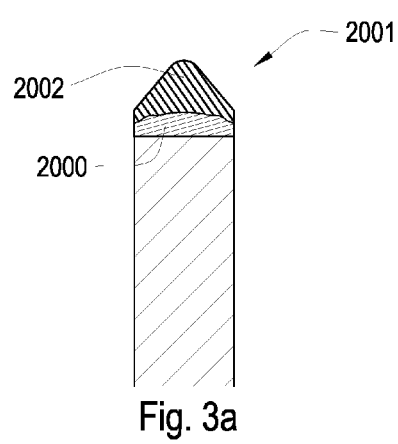

Referring now to FIG. 3, the milling machine 100 comprises a plurality of depth probes 109 arranged in an array 301. The array 301 may be used to detect the depth of a plurality of adjacent buried ferrous metal object 113. In some embodiments, the array 301 may be used to determine a safe perimeter around a buried metal object 114 by penetrating the paved surface 114 on two or more ends of the metal object 114. The array 301 may adjust laterally, vertically, and/or parallel to the direction (represented by arrow 302) of the movement of the milling machine. In some embodiments the array 301 may be adjusted only as a whole, whereas in other embodiments one or more depth probes 109 in an array 301 may be individually adjustable. FIG. 3 also discloses a plurality of magnetic sensors 105 disposed on the milling machine 100. FIG. 3a discloses an embodiment of a probe with a superhard tip 2001. The tip 2001 may comprise diamond 2002 bonded to a substrate 2000.

The metal detectors 105 may be arranged in a plurality of arrays, such that each array is positioned at a different distance above the surface 200. This may allow for the detectors to detect a depth of a metal object 113 in the paved surface 114. As the detectors pass over where the metal object 113 is covered, if the detection range of a first detector or array of detectors is not deep enough to detect the object 113, the range of a second detector or array may extend deep enough to detect it.

Figure 4:
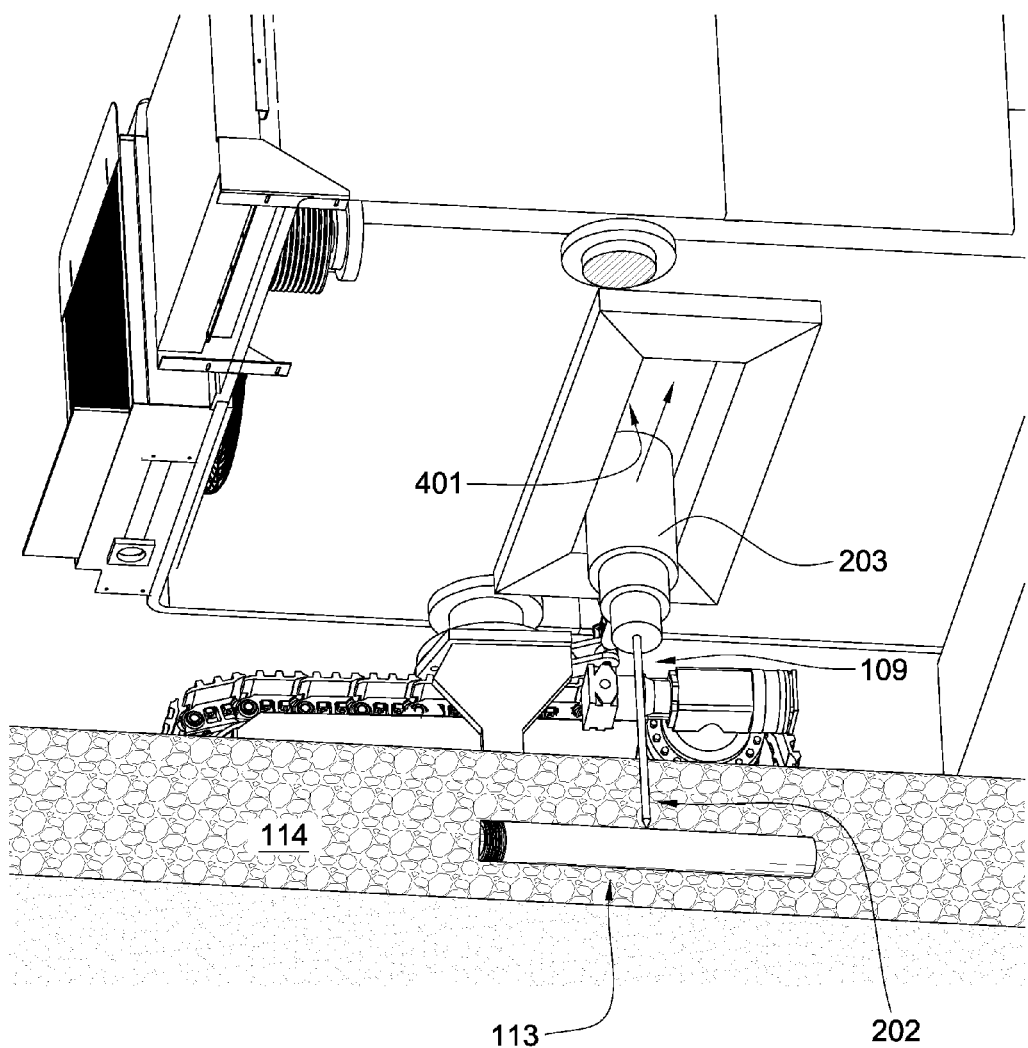
FIG. 4 is a perspective diagram of an embodiment of a depth probe.

Referring now to FIG. 4, the probe base 203 is laterally adjustable. The probe base 203 may be disposed on a track 401 and may be laterally adjusted by means of a motor, a winch, a pulley, a rack and pinion, or combinations thereof. Because the distal end 202 of the probe 109 is very small compared to milling tools 101, the distal end 202 of the probe me need to be laterally adjusted in order to contact all ferrous metal objects 113 that may interfere with the milling tools 101. By laterally adjusting the probe base 203 the distal end 202 of the probe may be moved to a position where it will contact the ferrous metal object 113 once it penetrates deep enough into the paved surface 114.

Figure 5:
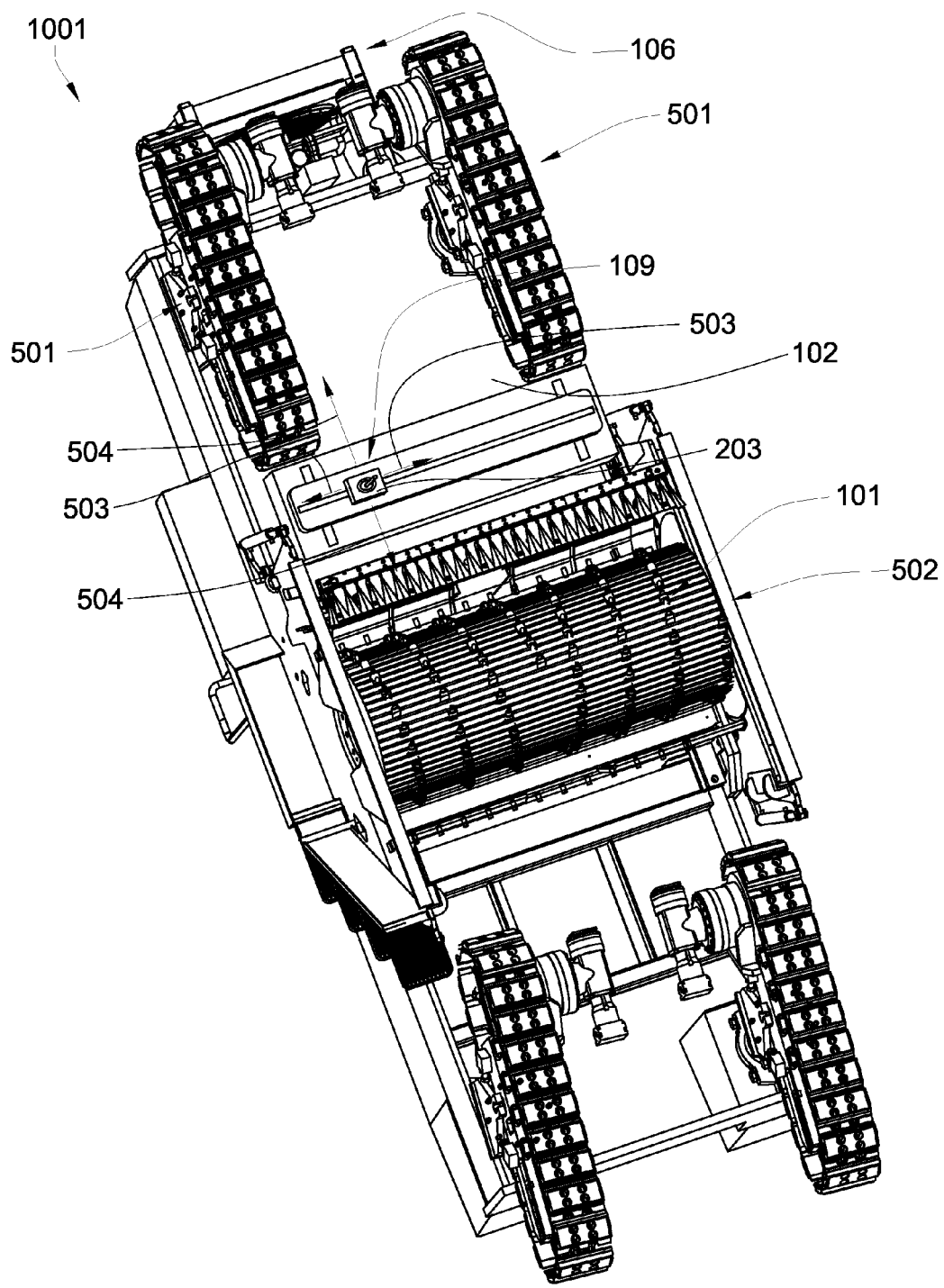
FIG. 5 is a perspective diagram of an embodiment of an underside of a milling machine.

FIG. 5 discloses a perspective view of an embodiment of the underside 102 of a milling machine 100. A depth probe 109 is disposed proximate two translation mechanisms 501. The translation mechanisms 501 are adapted to move the milling machine 100. The depth probe 109 is disposed intermediate the front end 106 of the machine 100 and the milling tools 101. The milling tools 101 are disposed on a milling drum 502. The base 203 of the prove 109 is adapted to translate both laterally (as represented by arrows 503) and parallel to a direction of travel of the machine 100 (as represented by arrows 504. In some embodiments the lateral and parallel translation of the probe base 203 may occur automatically in response to feedback from the monitor as detected by electronic equipment.

Figure 6:
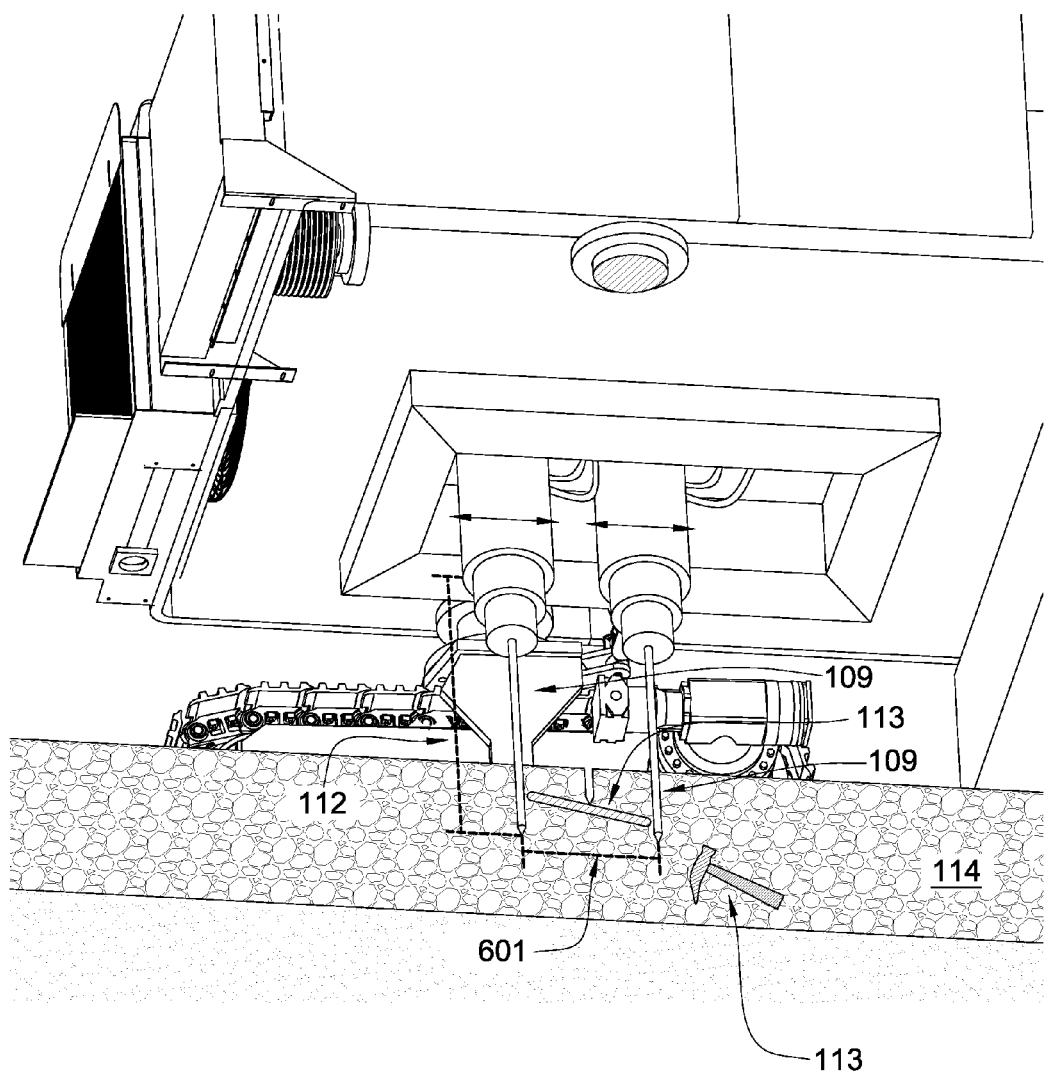
FIG. 6 is a perspective diagram of an embodiment of a plurality of depth probes.

FIG. 6 discloses an embodiment of the invention in which a plurality of depth probes 109 is adapted to determine a safe perimeter 601 around a buried metal object 113 by penetrating the paved surface 114. Each of the plurality of depth probes 109 may be adjusted laterally, vertically, and/or parallel to the direction of travel of the machine 100. After a buried ferrous metal object 113 has been detected, two or more depth probes 109 may penetrate the formation 114 until they pass the distance 112 at which the metal object 113 was detected. The position of the distal ends 202 of the at least two depth probes 109 when the distal ends 202 do not contact the metal object 113 at the distance 112 may be used to establish the safe perimeter 601. In some embodiments this may require repeated penetration of the paved surface 114.

Figure 7:
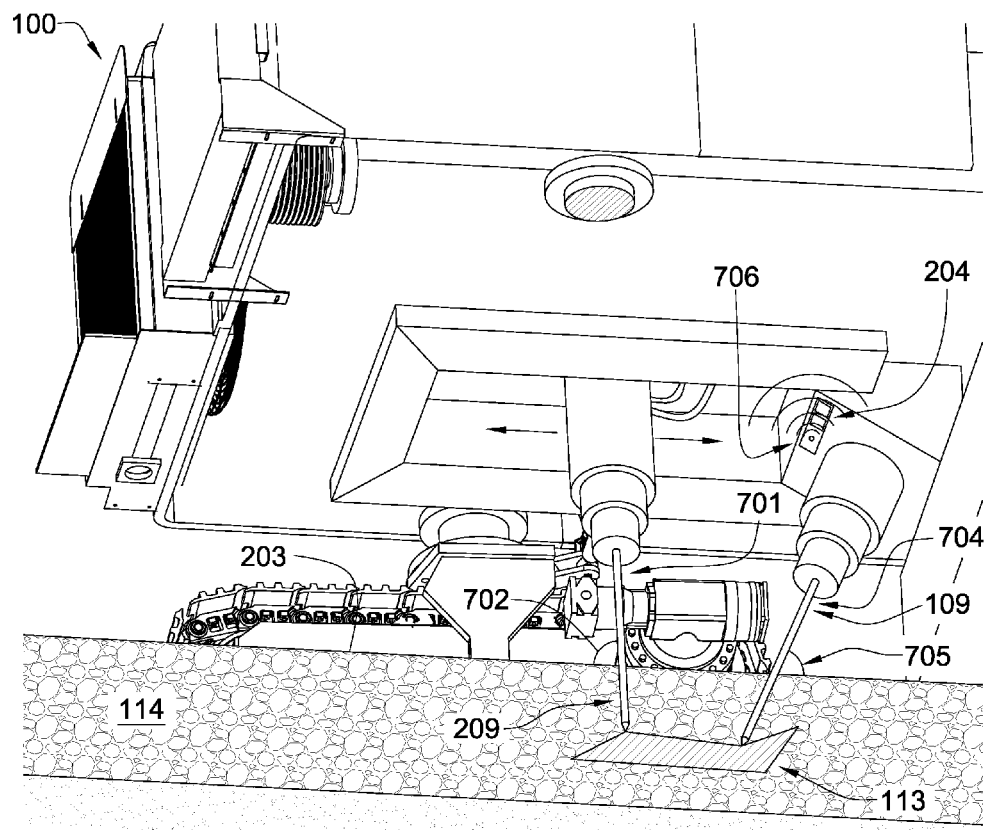
FIG. 7 is a perspective diagram of another embodiment of plurality of depth probes.
Figure 8:
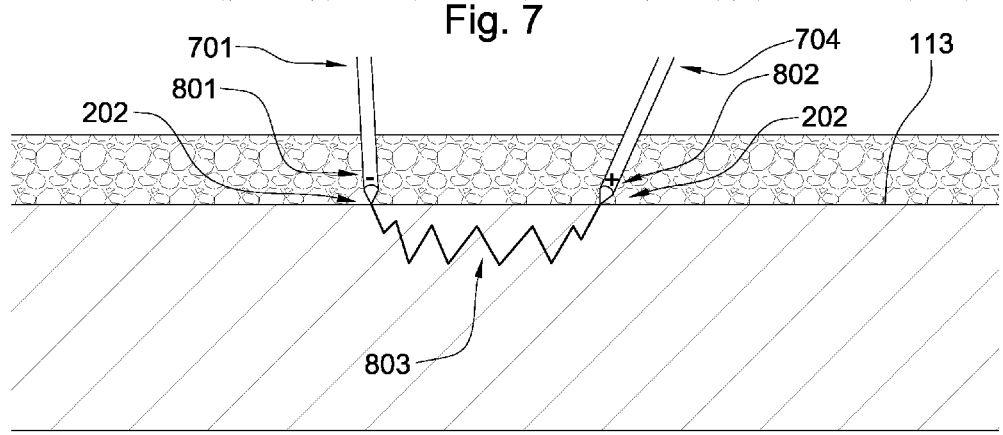
FIG. 8 is a perspective diagram of an embodiment of at least two electrodes disposed in the distal ends of at least two depth probes.

Referring now to FIGS. 7 and 8, embodiments of the invention are disclosed in which at least two of the plurality of depth probes 109 are positioned at different angles. A first depth probe 701 forms a right angle 702 with an exposed side 703 of the paved surface 114. A second depth probe 704 forms an acute angle 705 with the exposed side 703 of the paved surface 114. Using depth probes 109 positioned at different angles may be beneficial in detecting buried metal objects 113 comprising irregular shapes. A wireless transmitter 706 connected to a monitor 204 is shown disposed proximate the second depth probe 704. The wireless transmitter 706 may transmit information regarding the lateral or vertical position of the depth probe 109 to a remote location. The monitor 204 may comprise power supplies such as voltage or current sources.

FIG. 8 discloses first and second electrodes 801, 802 disposed on the distal ends 202 of the first and second depth probes 701, 704. The first electrode 801 may introduce an electrical current 803 into the buried ferrous metal object 113 while contacting the object 113. The second electrode 802 may detect the electrical current 803 that passes through metal object 113, indicating that the first and second electrodes 801, 802 are in electrical communication with one another, suggesting that they are in contact with the same metal object 113. Any difference in the current detected by the second electrode 802 from the current introduced by the first electrode 801 may be detected and calculated into a resistance value, which may provide insight into the composition of the buried metal object 113. In some embodiments of the invention, each of the first and second depth probes 801, 802 may comprise a magnetic sensor 105 disposed on its distal end 202.

Figure 8A:
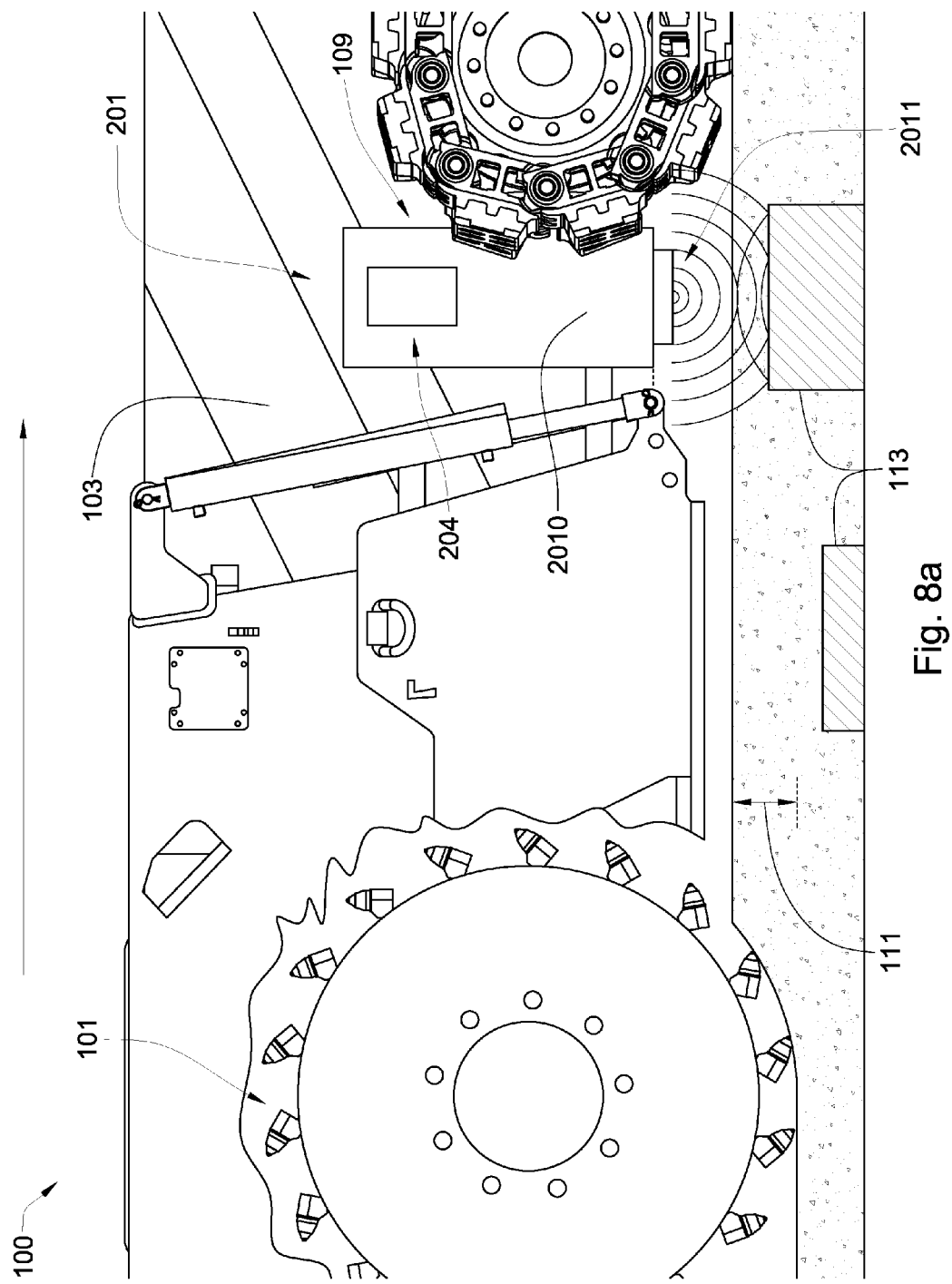

FIG. 8a discloses a milling machine with a depth detection assembly 2010. In this embodiment the depth detection assembly comprises ground penetrating radar 2011.

Referring now to FIG. 9, a method 900 for metal detection during milling of paved surface is disclosed. The method 900 comprises a step 901 of providing a milling machine 100. The milling machine comprises milling tools 101 connected to an underside 102 of a body 103 of the machine 100 and a depth probe 109 connected to a front end 106 of the machine 100 through a probe base 203 disposed proximate a base end 201 of the probe 109 opposite a distal end 202 of the probe 109. The method further comprises a step 902 of extending the distal end 202 of the probe 109 away from the base 203, and step 903 of penetrating a paved surface 114 with the distal end 202 of the probe 109 until the distal end 202 contacts a ferrous metal object 113. The method also comprises a step 904 of measuring a distance from the distal end 202 of the probe 109 to the base 203 of the probe 109. In some embodiments the method 900 may further comprise a step of sensing a ferrous metal object 113 disposed beneath a road surface 114 from above the road surface 114. This step may involve using a magnetic sensor 105. The method may also comprise a step of passing an electrical current and/or a magnetic field through the ferrous metal object 113 from the distal end 202 of a first depth probe 801 to the distal end 202 of a second depth probe 802.

Whereas the present invention has been described in particular relation to the drawings attached hereto, it should be understood that other and further modifications apart from those shown or suggested herein, may be made within the scope and spirit of the present invention.

What is claimed is:

1. A milling machine for milling a paved surface, comprising:
   milling tools connected to an underside of a body of the machine;
   a depth probe comprising a base end opposite a distal end;
   the probe being connected to a front end of the machine through a probe base disposed proximate the base end;
   a monitor adapted to detect a distance between the distal end of the probe and an outer surface of the base; and
   wherein the distal end of the probe is adapted to extend away from the outer surface of the base and penetrate into a paved surface.

2. The machine of claim 1, wherein the depth probe is disposed intermediate at least one magnetic sensor attached to the front end of the machine and the milling tools.

3. The machine of claim 2, wherein a detection range of the at least one magnetic sensor extends farther into the paved surface than a detection depth of the extendable depth probe.

4. The machine of claim 1, wherein the probe base is adapted to translate parallel to a direction of travel of the machine.

5. The machine of claim 1, wherein the depth probe is adapted to determine a depth of a buried metal object in the paved surface.

6. The machine of claim 1, wherein the monitor is adapted to detect a change in pressure when the depth probe contacts a buried ferrous metal object and/or a road base.

7. The machine of claim 1, wherein the machine comprises a plurality of depth probes arranged in an array.

8. The machine of claim 7, where the plurality of depth probes is adapted to determine a safe perimeter around a buried ferrous metal object by penetrating the paved surface.

9. The machine of claim 7, wherein at least two of the plurality of depth probes are positioned at different angles.

10. The machine of claim 7, wherein at least two of the plurality of depth probes each comprise an electrode disposed on the distal end.

11. The machine of claim 7, wherein at least two of the plurality of depth probes each comprise a magnetic sensor disposed on the distal end.

12. The machine of claim 1, wherein the probe base is laterally adjustable.

13. The machine of claim 1, wherein the machine comprises electronic equipment in electrical communication with the monitor and the equipment is adapted to interpret feedback from the monitor and/or record the position of the distal end of the probe with respect to the outer surface of the probe base.

14. The machine of claim 13, wherein the milling tools are adapted to be automatically laterally or vertically adjusted by the electronic equipment in response to feedback from the monitor.

15. The machine of claim 1, wherein the machine comprises a hydraulic press disposed intermediate the base of the probe and the body of the machine, the hydraulic press being adapted to extend the distal end of the probe away from the body of the machine.

16. A method for metal detection during milling of a paved surface, comprising the steps of:
   providing a milling machine comprising milling tools connected to an underside of a body of the machine and comprising a depth probe connected to a front end of the machine through a probe base disposed proximate a base end of the probe opposite a distal end of the probe;
   extending the distal end of the probe away from the base;
   penetrating a paved surface with the distal end of the probe until the distal end contacts a ferrous metal object;
   measuring a distance from the distal end of the probe to the probe base.

17. The method of claim 16, wherein the method further comprises a step of sensing a ferrous metallic object disposed beneath a road surface from above the road surface.

* * * * *